United States Patent
Iida et al.

(10) Patent No.: US 7,677,027 B2
(45) Date of Patent: Mar. 16, 2010

(54) DETERIORATION DETECTING APPARATUS FOR CATALYST

(75) Inventors: Jun Iida, Wako (JP); Hidetaka Maki, Wako (JP); Yukio Suehiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 540 days.

(21) Appl. No.: 11/717,711

(22) Filed: Mar. 14, 2007

(65) Prior Publication Data

US 2007/0220863 A1 Sep. 27, 2007

(30) Foreign Application Priority Data

Mar. 24, 2006 (JP) ............... 2006-082098

(51) Int. Cl.
*F01N 3/00* (2006.01)

(52) U.S. Cl. ............... 60/277; 60/274; 60/285; 60/286

(58) Field of Classification Search ............... 60/274, 60/276, 277, 285, 286; 701/103, 109
See application file for complete search history.

(56) References Cited

U.S. PATENT DOCUMENTS

2002/0152743 A1 10/2002 Nakamura
2002/0194840 A1 12/2002 Kako et al.
2003/0019485 A1 1/2003 Kobayashi et al.
2007/0033924 A1 2/2007 Enoki et al.

FOREIGN PATENT DOCUMENTS

JP 02-207159 A 8/1990

*Primary Examiner*—Binh Q. Tran
(74) *Attorney, Agent, or Firm*—Arent Fox LLP

(57) ABSTRACT

A deterioration detecting apparatus for a purifying catalyst in an exhaust system of an engine. A first oxygen concentration sensor is disposed upstream of the catalyst. A second oxygen concentration sensor is disposed downstream. An amount of oxygen flowing into the catalyst is calculated from the oxygen concentration detected by the first sensor and the detected intake air flow rate. A control command value of an air-fuel ratio is alternately switched between a first value corresponding to a lean air-fuel ratio and a second value corresponding to a rich air-fuel ratio according to a result of comparison between the calculated inflowing oxygen amount and target values. Excessive inflowing oxygen amounts are calculated. The target values are corrected with the excessive inflowing oxygen amount. A deterioration degree of the catalyst is detected based on an output of the second sensor when performing the switching of the control command value using the corrected target values.

9 Claims, 12 Drawing Sheets

*FIG. 2A* *FIG. 2B*
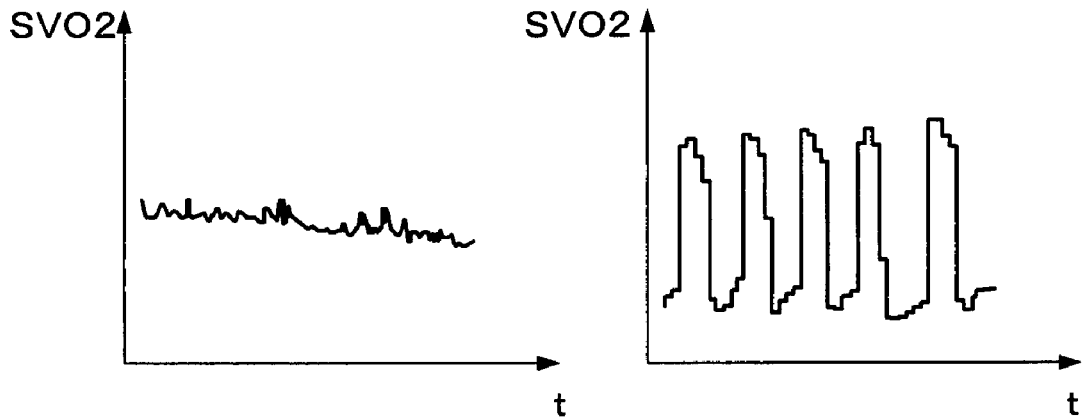
*FIG. 3*
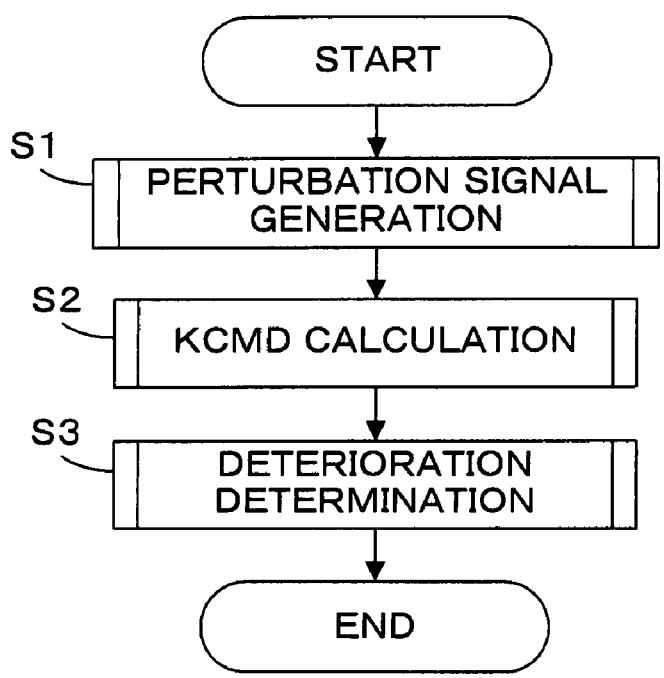

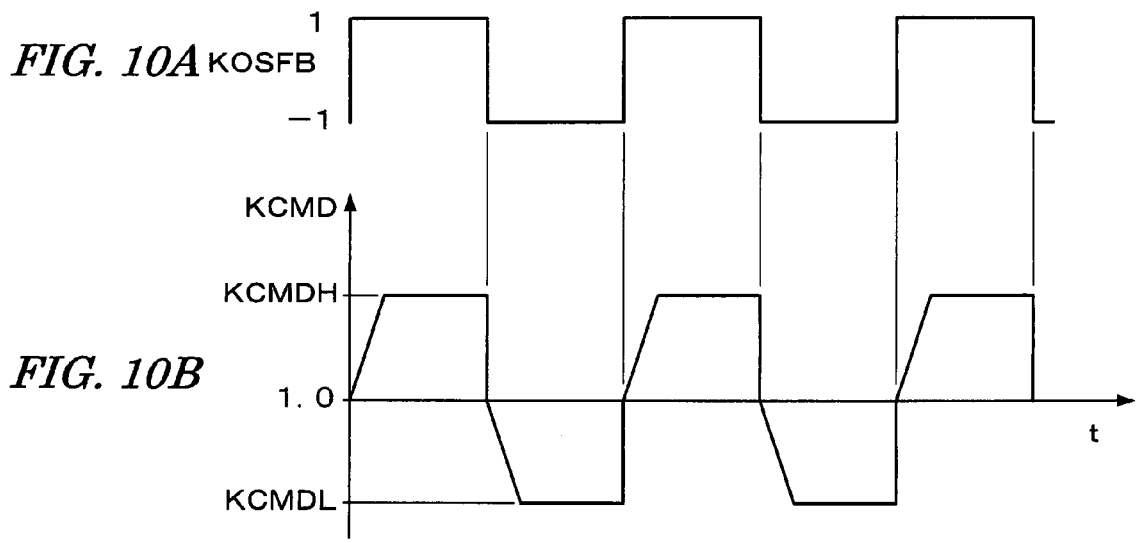
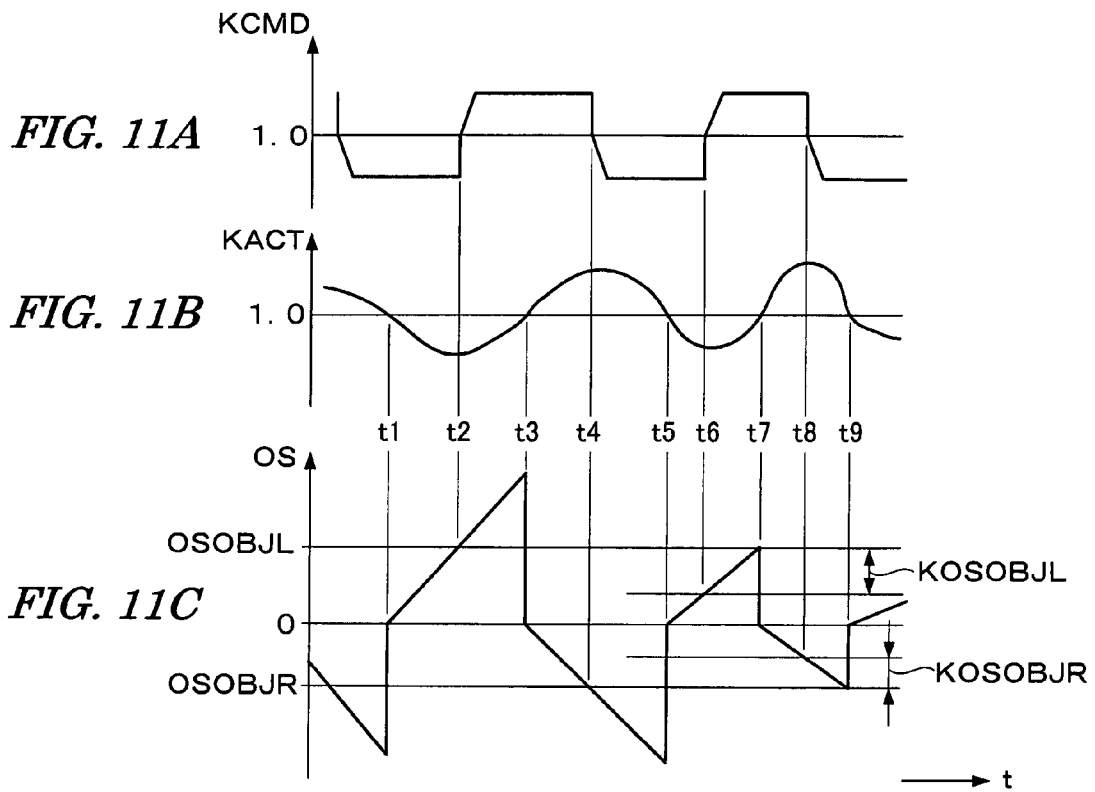

DETERIORATION DETECTING APPARATUS FOR CATALYST

BACKGROUND OF THE INVENTION

1. Field of the Invention

The present invention relates to a deterioration detecting apparatus for a catalyst which is provided in an exhaust system of an internal combustion engine for purifying exhaust gases and, particularly, to the deterioration detecting apparatus that detects a degree of deterioration of the catalyst.

2. Description of the Related Art

A technique for determining the deterioration of the catalyst provided in an exhaust system of an internal combustion engine for purifying exhaust gases (hereinafter referred to simply as "catalyst") is conventionally known. For example, Japanese Patent Laid-open No. H02-207159 discloses an apparatus for detecting deterioration of the catalyst. This apparatus measures a first time period CB and/or a second time period CA and determines deterioration of the catalyst based on the first time period CB and/or the second time period CA. The first time period CB is a time period from the time the air-fuel ratio of the air-fuel mixture supplied to the engine is switched from lean to rich with respect to the stoichiometric air-fuel ratio to the time an output of an air-fuel ratio sensor (oxygen concentration sensor) disposed downstream of the catalyst changes to a value indicative of a rich air-fuel ratio. The second time period CA is a time period from the time the air-fuel ratio is switched from rich to lean with respect to the stoichiometric ratio to the time the output of the air-fuel ratio sensor disposed downstream of the catalyst changes to a value indicative of the lean air-fuel ratio.

In the above-described conventional apparatus, the degree of deterioration of the catalyst is detected by the change of the output of the air-fuel ratio sensor disposed downstream of the catalyst by an amount greater than a predetermined value. Accordingly, even when the determination is performed with respect to a normal (not deteriorated) catalyst, it is necessary to change the air-fuel ratio so that the output of the downstream side air-fuel ratio sensor changes by an amount greater than the predetermined value. Therefore, there is a problem that the time period in which the exhaust characteristics are getting worse is likely to be prolonged by performing the deterioration detection.

SUMMARY OF THE INVENTION

The present invention was attained contemplating the above-described situation, and an aspect of the present invention is to provide a deterioration detecting apparatus for a catalyst which can detect the degree of deterioration of the catalyst with sufficient accuracy and without making the exhaust characteristics worse.

To attain the above-described aspect, the present invention provides a deterioration detecting apparatus for a catalyst provided in an exhaust system of an internal combustion engine for purifying exhaust gases. The deterioration detecting apparatus detects deterioration of the catalyst and includes intake air flow rate detecting means, a first oxygen concentration sensor, a second oxygen concentration sensor, inflowing oxygen amount calculating means, air-fuel ratio switching control means, excessive inflowing oxygen amount calculating means, target value correcting means, and deterioration detecting means. The intake air flow rate detecting means detects an intake air flow rate (GAIR) of the engine. The first oxygen concentration sensor is provided upstream of the catalyst. The second oxygen concentration sensor is provided downstream of the catalyst. The inflowing oxygen amount calculating means calculates an amount of oxygen (OS) flowing into the catalyst according to the oxygen concentration (O2N) detected by the first oxygen concentration sensor and the intake air flow rate (GAIR) detected by the intake air flow rate detecting means. The air-fuel ratio switching control means alternately switches a control command value (KCMD) of an air-fuel ratio of an air-fuel mixture supplied to the engine between a first value corresponding to a lean air-fuel ratio (KCMDL) which is leaner than the stoichiometric ratio and a second value corresponding to a rich air-fuel ratio (KCMDH) which is richer than the stoichiometric ratio according to a result of comparison between the inflowing oxygen amount (OS) calculated by the inflowing oxygen amount calculating means and target values (OSOBJR, OSOBJL) of the inflowing oxygen amount. The excessive inflowing oxygen amount calculating means calculates excessive inflowing oxygen amounts (KOSOBJL, KOSOBJR) which are amounts of oxygen flowing into the catalyst from the time the control command value (KCMD) is switched from the first value (KCMDL) to the second value (KCMDH) or vice versa to the time the oxygen concentration (KACT) detected by the first oxygen concentration sensor reaches a value (1.0) corresponding to the stoichiometric ratio. The target value correcting means corrects the target values (OSOBJR, OSOBJL) of the inflowing oxygen amount with the excessive inflowing oxygen amounts (KOSOBJL, KOSOBJR). The deterioration detecting means detects a deterioration degree (RESULT) of the catalyst based on an output (SVO2) of the second oxygen concentration sensor during an operation of the air-fuel ratio switching control means. The air-fuel ratio switching control means performs the switching of the air-fuel ratio using the target values (OSOBJRM, OSOBJLM) corrected by the target value correcting means.

With the above-described structural configuration, the amount of oxygen flowing into the catalyst is calculated according to the oxygen concentration detected by the first oxygen concentration sensor and the intake air flow rate detected by the intake air flow rate detecting means. The air-fuel ratio switching control (perturbation control) in which the control command value of the air-fuel ratio of the air-fuel mixture supplied to the engine is switched from the first value corresponding to the lean air-fuel ratio to the second value corresponding to the rich air-fuel ratio, or vice versa, is performed according to a result of comparison between the inflowing oxygen amount and the target values of the inflowing oxygen amount. The deterioration degree of the catalyst is detected based on the output of the second oxygen concentration sensor during execution of the air-fuel ratio switching control. By setting the target values of the inflowing oxygen amount so that the second oxygen concentration sensor output minimally changes when the catalyst is normal and the second oxygen concentration sensor output greatly changes when the catalyst is deteriorated, the deterioration degree can be detected quickly at the time the catalyst begins to deteriorate, resulting in minimal degradation of the exhaust characteristics and without degrading the exhaust characteristics at all while the catalyst remains normal.

Further, the excessive inflowing oxygen amounts, which are amounts of oxygen flowing into the catalyst from the time the control command value is switched from the first value to the second value, or vice versa, to the time the oxygen concentration detected by the first oxygen concentration sensor reaches the value corresponding to the stoichiometric ratio, are calculated, and the target values are corrected using the excessive inflowing oxygen amounts. Due to some causes, such as adhesion of fuel to the intake port, or a response delay of the first oxygen concentration sensor, there can be a delay time period from the time of changing the control command value of the air-fuel ratio to the time the oxygen concentration detected by the first oxygen concentration sensor changes to a value corresponding to the changed air-fuel ratio. The excessive inflowing oxygen amount is an amount of oxygen flowing into the catalyst during this delay time period. Therefore, by correcting the target values with the excessive inflowing oxygen amounts, the actual amount of oxygen flowing into the catalyst is appropriately controlled, thereby improving determination accuracy of the catalyst deterioration.

Preferably, the excessive inflowing oxygen amount calculating means accumulates the oxygen concentration (O2N) detected by the first oxygen concentration sensor from the time (t2, t4, t6, t8) when the control command value is switched from the first value to the second value or vice versa to the time (t3, t5, t7, t9) when the oxygen concentration (O2N) detected by the first oxygen concentration sensor reaches the value corresponding to the stoichiometric ratio and multiplies the accumulated oxygen concentration (SUMO2) by the inflowing air flow rate (GAIR) to calculate the excessive inflowing oxygen amounts (KOSOBJL, KOSOBJR).

With this structural configuration, the oxygen concentration detected by the first oxygen concentration sensor is accumulated from the time when the control command value is switched from the first value to the second value, or vice versa, to the time when the oxygen concentration detected by the first oxygen concentration sensor reaches the value corresponding to the stoichiometric ratio, and the accumulated oxygen concentration is multiplied by the inflowing air flow rate to calculate the excessive inflowing oxygen amounts.

Alternatively, the excessive inflowing oxygen amount calculating means includes storing means and total inflowing oxygen amount calculating means. The storing means stores a value of the inflowing oxygen amount obtained at the time (t2, t4, t6, t8) when the control command value is switched from the first value to the second value, or vice versa, as a switching time inflowing oxygen amount (BOSOBJ). The total inflowing oxygen amount calculating means calculates a total inflowing oxygen amount (OS) which is an amount of oxygen flowing into the catalyst from the time (t1, t3, t5, t7) when the oxygen concentration detected by the first oxygen concentration sensor reaches the value corresponding to the stoichiometric ratio to the time (t3, t5, t7, t9) when the oxygen concentration detected by the first oxygen concentration sensor next reaches the value corresponding to the stoichiometric ratio. The excessive inflowing oxygen amount calculating means calculates the excessive inflowing oxygen amounts (KOSOBJL, KOSOBJR) with the switching time inflowing oxygen amount (BOSOBJ) and the total inflowing oxygen amount (OS).

With this structural configuration, the value of the inflowing oxygen amount which is obtained at the time when the control command value is switched from the first value to the second value, or vice versa, as the switching time inflowing oxygen amount, and the total inflowing oxygen amount, which is an amount of oxygen flowing into the catalyst from the time when the oxygen concentration detected by the first oxygen concentration sensor reaches the value corresponding to the stoichiometric ratio to the time when the oxygen concentration detected by the first oxygen concentration sensor next reaches the value corresponding to the stoichiometric ratio, are calculated. The excessive inflowing oxygen amount is calculated with the switching time inflowing oxygen amount and the total inflowing oxygen amount.

BRIEF DESCRIPTION OF THE DRAWINGS

FIGS. 2A and 2B are graphs depicting a deterioration detecting method of the catalyst;

FIG. 3 is a flowchart of a main routine for performing the deterioration detection of the catalyst;

FIGS. 10A and 10B are time graphs showing the process of FIG. 9;

FIGS. 11A-11C are time graphs showing the processes of FIGS. 4, 5, and 9;

DETAILED DESCRIPTION OF THE PREFERRED EMBODIMENTS

Preferred embodiments of the present invention will now be described with reference to the drawings.

Figure 1:
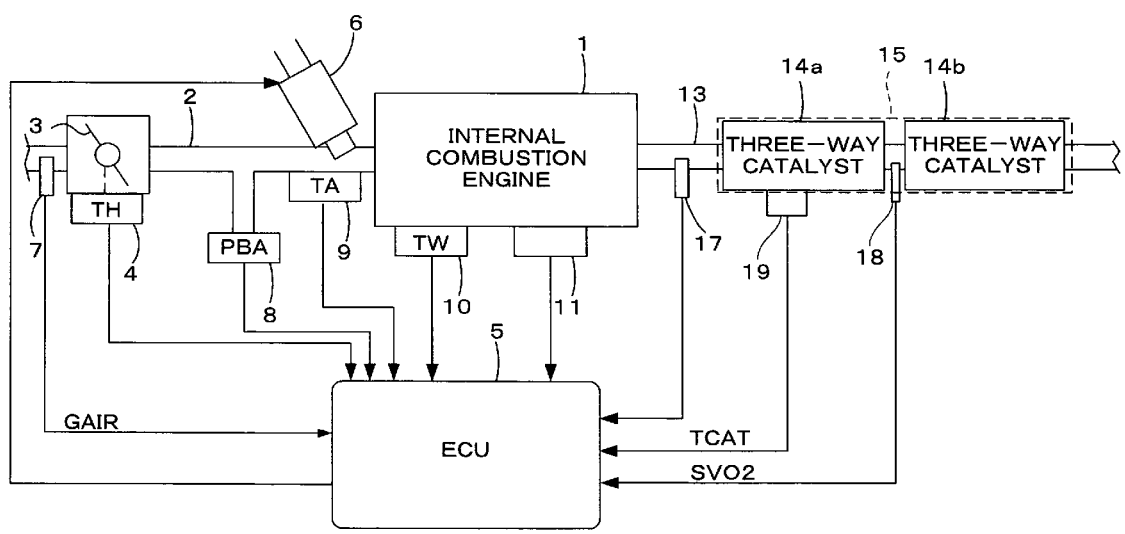
FIG. 1 is a schematic diagram of an internal combustion engine and a control system therefor, including a deterioration detecting apparatus for a catalyst according to one embodiment of the present invention.

FIG. 1 is a schematic diagram showing a general configuration of an internal combustion engine (hereinafter referred to as "engine") and a control system therefor, including a deterioration detecting apparatus for a catalyst according to one embodiment of the present invention. The engine is, for example, a four-cylinder engine 1 having an intake pipe 2 provided with a throttle valve 3. A throttle valve opening (TH) sensor 4 is connected to the throttle valve 3, so as to output an electrical signal according to the amount of opening of the throttle valve 3 and to supply the electrical signal to an electronic control unit 5 (hereinafter referred to as "ECU").

Fuel injection valves 6 are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown) and electrically connected to the ECU 5. A valve opening period of each fuel injection valve 6 is controlled by a signal output from the ECU 5.

An intake air flow rate sensor 7 for detecting an intake air flow rate GAIR is disposed upstream of the throttle valve 3. Further, an intake pressure sensor 8 for detecting an intake pressure PBA and an intake air temperature sensor 9 for detecting an intake air temperature TA are disposed downstream of the throttle valve 3. The detection signals of these sensors are supplied to the ECU 5.

An engine coolant temperature (TW) sensor 10, such as a thermistor, is mounted on the body of the engine 1 to detect an engine coolant temperature (cooling water temperature) TW. A temperature signal corresponding to the detected engine coolant temperature TW is output from the sensor 10 and supplied to the ECU 5.

A crank angle position sensor 11 for detecting a rotation angle of a crankshaft (not shown) of the engine 1 is connected to the ECU 5, and a signal corresponding to a detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for a specific cylinder of the engine 1. The crank angle position sensor 11 also includes a top dead center (TDC) sensor which outputs a TDC pulse at a crank angle position before a TDC of a predetermined crank angle starts at an intake stroke in each cylinder (i.e., at every 180° crank angle in the case of a four-cylinder engine) and a crank angle (CRK) sensor for generating one pulse (hereinafter referred to as "CRK pulse") with a CRK period (e.g., a period of 30°, shorter than the period of generation of the TDC pulse). The CYL pulse, the TDC pulse and the CRK pulse are supplied to the ECU 5. The CYL, TDC and CRK pulses are used to control the various timings, such as a fuel injection timing and an ignition timing, and to detect an engine rotational speed NE.

The exhaust pipe 13 is provided with a catalyst unit 15 which is configured with one container containing two three-way catalysts 14a and 14b.

The three-way catalysts 14a and 14b have oxygen storing capacity and store oxygen contained in the exhaust gases in the exhaust lean condition where the air-fuel ratio of the air-fuel mixture supplied to the engine 1 is set to be lean with respect to the stoichiometric ratio, and the oxygen concentration in the exhaust gases is therefore relatively high. The three-way catalysts oxidize HC and CO contained in the exhaust gases with the stored oxygen in the exhaust rich condition where the air-fuel ratio of the air-fuel mixture supplied to the engine 1 is set to be rich with respect to the stoichiometric ratio, and the oxygen concentration in the exhaust gases is therefore low with a relatively large amount of HC and CO components.

A proportional type oxygen concentration sensor 17 (hereinafter referred to as "LAF sensor 17") is mounted on the upstream side of the catalyst unit 15. The LAF sensor 17 outputs the electrical signal substantially proportional to the oxygen concentration (air-fuel ratio) in the exhaust gases and supplies the electrical signal to the ECU 5.

A binary type oxygen concentration sensor 18 (hereinafter referred to as "O2 sensor") is mounted in the exhaust pipe 13 at a position between three-way catalysts 14a and 14b. The detection signal thereof is supplied to the ECU 5. The O2 sensor 18 has a characteristic such that its output rapidly changes in the vicinity of the stoichiometric ratio. Specifically, the O2 sensor 18 outputs a high-level signal in a rich region with respect to the stoichiometric ratio, and outputs a low-level signal in a lean region with respect to the stoichiometric ratio. Further, the three-way catalyst 14a is provided with a catalyst temperature sensor 19 for detecting a temperature TCAT (hereinafter referred to as "catalyst temperature") of the three-way catalyst 14a. The detection signal is supplied to the ECU 5.

The ECU 5 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies control signals to the fuel injection valves 6.

The CPU in the ECU 5 determines various engine operating conditions according to various engine operating parameter signals described above and calculates a fuel injection period TOUT of each fuel injection valve 6 to be opened in synchronism with the TDC signal pulse for each cylinder, using equation (1) according to the above-determined engine operating conditions.

$$TOUT = TIM \times KCMD \times KAF \times K1 + K2 \qquad (1)$$

TIM is a basic fuel amount, specifically, a basic fuel injection period of each fuel injection valve 6, which is determined by retrieving a value TI from a TIM table set according to the intake flow rate. The TIM table is set so that the air-fuel ratio of the air-fuel mixture supplied to the engine 1 becomes substantially equal to the stoichiometric ratio.

KCMD is a target air-fuel ratio coefficient or command control value set according to the O2 sensor output SVO2 when performing a normal control. The target air-fuel ratio coefficient KCMD is proportional to the reciprocal of the air-fuel ratio A/F, i.e., proportional to a fuel-air ratio F/A, and takes a value of "1.0" for the stoichiometric ratio. Therefore, the target air-fuel ratio coefficient KCMD is also referred to as "target equivalent ratio". When performing a deterioration determination of the catalyst described below, the target air-fuel ratio coefficient KCMD is set so that the air-fuel ratio is controlled to be alternately rich and lean with respect to the stoichiometric ratio.

KAF is an air-fuel ratio correction coefficient calculated using a PID (proportional, integral, and differential) control method or an adaptive control method using a self-tuning regulator so that a detected equivalent ratio KACT calculated from a detected value of the LAF sensor 17 coincides with the target equivalent ratio KCMD when an execution condition of the air-fuel ratio feedback control is satisfied.

K1 and K2 are, respectively, a correction coefficient and a correction variable computed according to various engine parameter signals. The correction coefficient K1 and the correction variable K2 are set to predetermined values that optimize various characteristics, such as fuel consumption characteristics and engine acceleration characteristics, according to engine operating conditions.

The CPU in the ECU 5 supplies a drive signal for opening each fuel injection valve 6 according to the fuel injection period TOUT obtained as described above through the output circuit to the fuel injection valve 6. Further, the CPU in the ECU 5 performs the deterioration determination of the three-way catalyst 14a as described below. For example, when the three-way catalyst 14a is determined to be deteriorated, it is estimated that the other three-way catalyst 14b is also deteriorated to almost the same degree, and a warning lamp in the vehicle can be turned on.

The deterioration determination of the three-way catalyst is performed based on the O2 sensor output SVO2 when changing the air-fuel ratio of the air-fuel mixture supplied to the engine 1 with a center of the stoichiometric ratio (when alternately performing the lean operation and the rich operation). As described above, the control in which the lean operation and the rich operation are alternately performed is hereinafter referred to as "perturbation control." Specifically, the lean operation is performed for supplying oxygen to the three-way catalyst by an amount that can be stored in the normal non-deteriorated three-way catalyst but cannot be stored in the deteriorated three-way catalyst. Thereafter, the lean operation is switched to the rich operation. The rich operation is performed so that almost all of the stored oxygen is discharged or consumed. When such perturbation control is executed, the O2 sensor output SVO2 hardly changes as shown in FIG. 2A if the three-way catalyst is not deteriorated. However, if the three-way catalyst is deteriorated, the O2 sensor output greatly changes as shown in FIG. 2B. Therefore, in this embodiment, the deterioration determination of the three-way catalyst is performed by detecting this difference.

FIG. 3 is a flowchart of a main routine of the deterioration determination process of the three-way catalyst. This process is executed by the CPU in the ECU 5 at predetermined time intervals (for example, 10 milliseconds).

Figure 4:
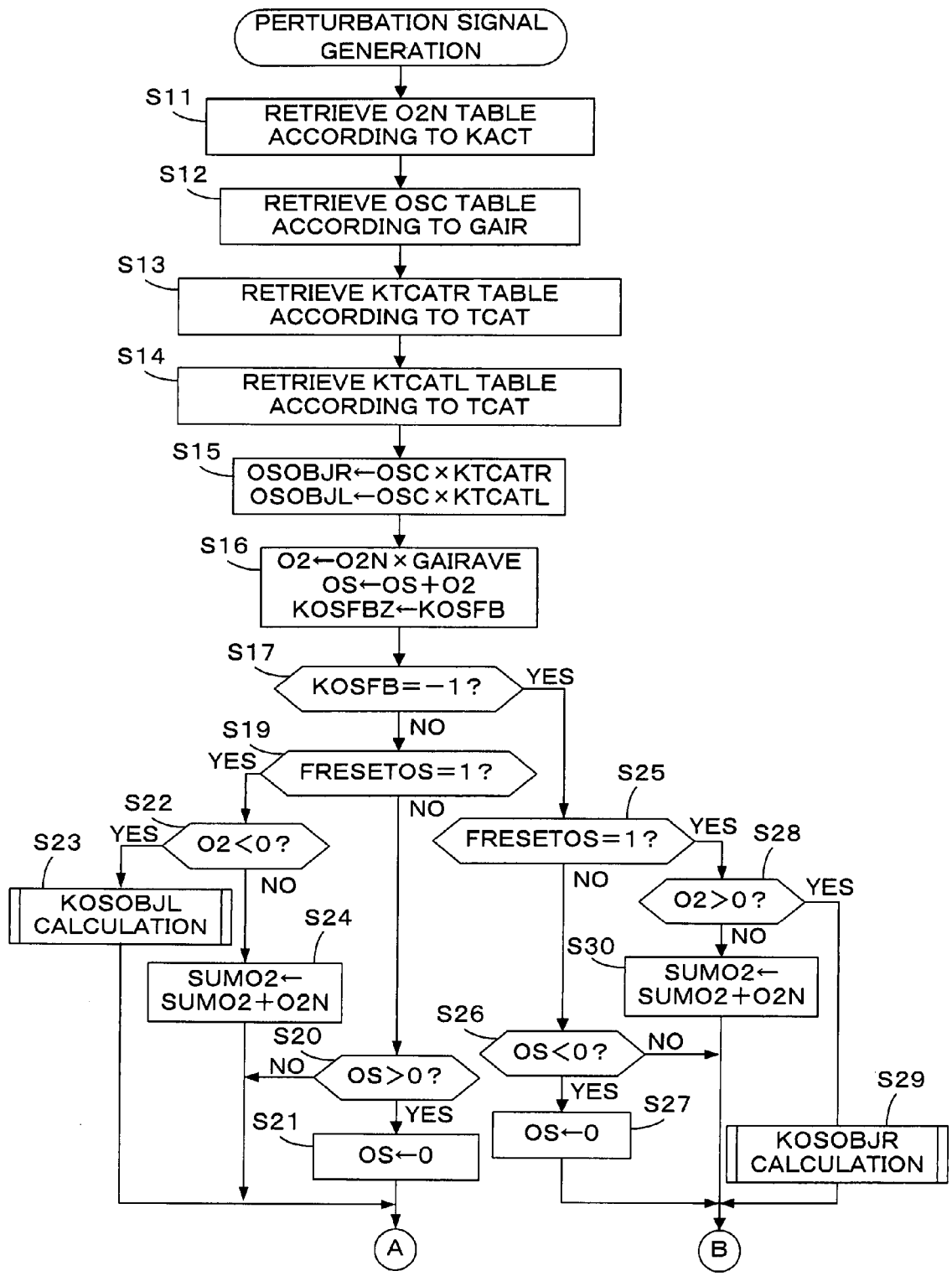
FIGS. 4 and 5 are flowcharts of a perturbation signal generation process executed in the process of FIG. 3.
Figure 5:
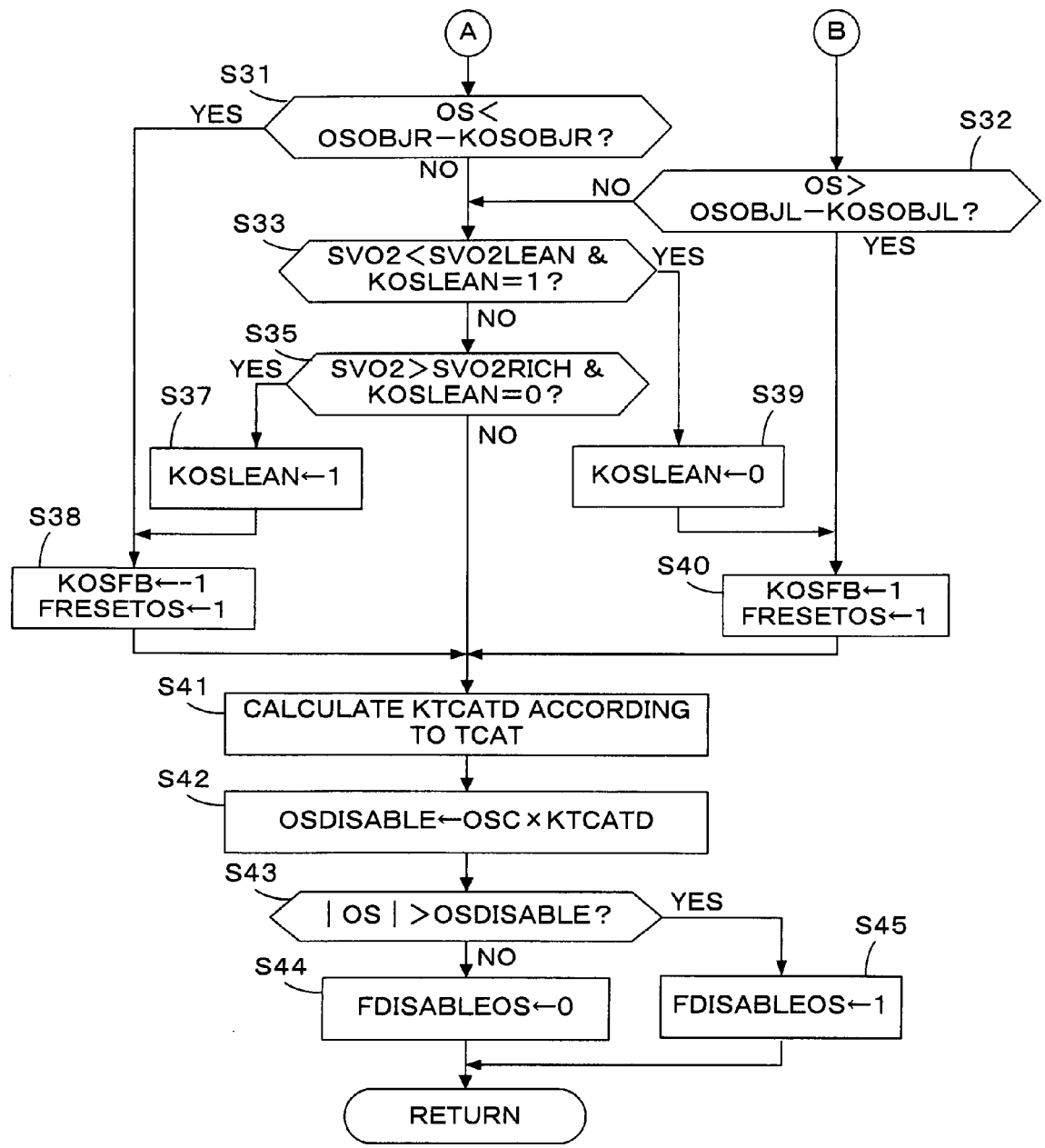
Figure 7:
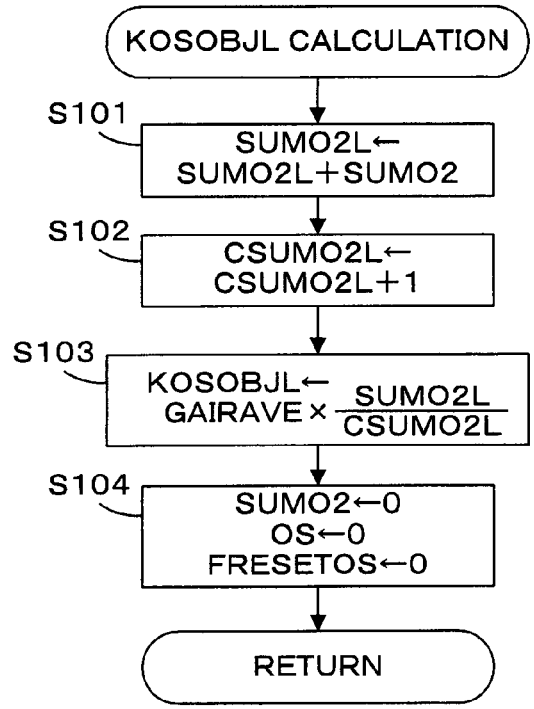
FIG. 7 is a flowchart of the KOSOBJL calculation process executed in the process of FIG. 4.

In step S1, the process shown in FIGS. 4 and 5 is executed, and a perturbation signal for changing the air-fuel ratio is generated. Specifically, the generation of the perturbation signal corresponds to setting an air-fuel ratio switching parameter KOSFB to "1" or "−1". In step S2, the process shown in FIG. 7 is executed to set the target air-fuel ratio coefficient KCMD according to the air-fuel ratio switching parameter KOSFB. During normal control, the target air-fuel ratio coefficient KCMD is set according to the output SVO2 of the O2 sensor 18. However, when the deterioration determination of the three-way catalyst is performed, the target air-fuel ratio coefficient KCMD is set according to the air-fuel ratio switching parameter KOSFB that is set in step S1, thereby performing the perturbation control of the air-fuel ratio.

Figure 12:
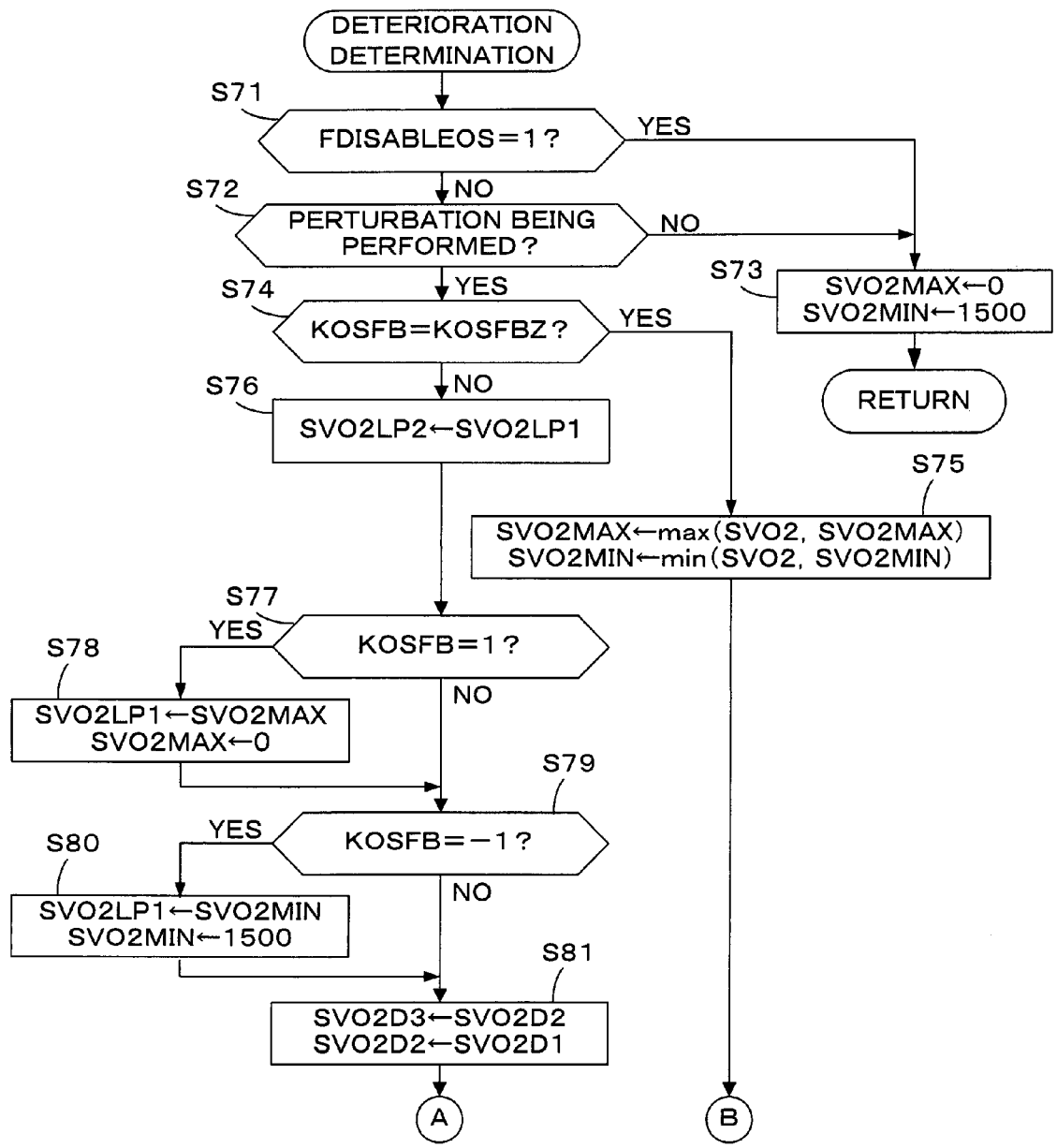
FIGS. 12 and 13 are flowcharts of the deterioration determination process executed in the process of FIG. 3.
Figure 13:
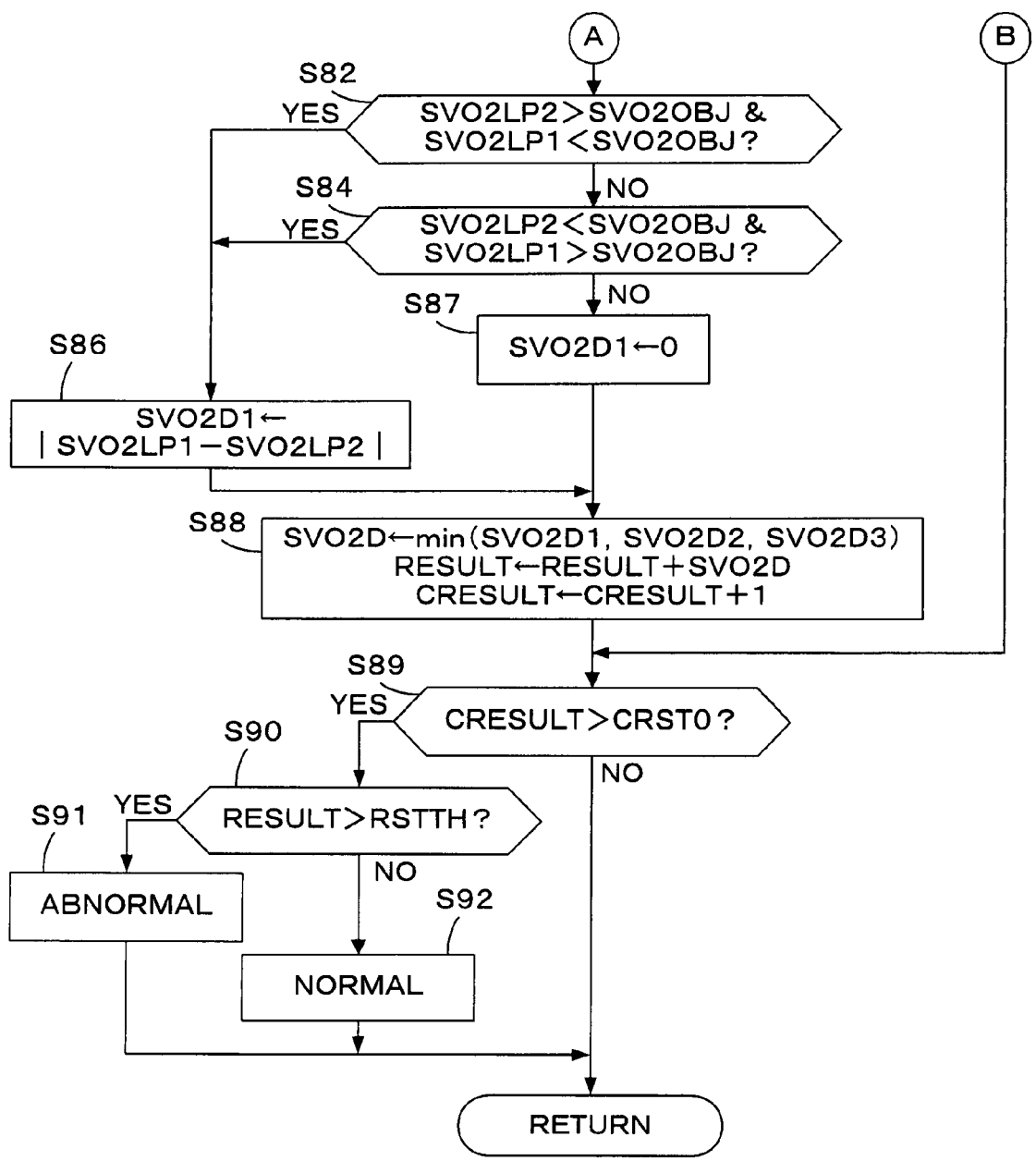

In step S3, the process shown in FIGS. 12 and 13 is executed. A determination parameter RESULT indicative of the deterioration degree of the three-way catalyst 14a is calculated based on the O2 sensor output SVO2 during the perturbation control. If the determination parameter RESULT exceeds a determination threshold value RSTTH, the three-way catalyst 14a is determined to be deteriorated beyond an acceptable amount.

FIGS. 4 and 5 show a flowchart of a perturbation signal generation process executed in step S1 of FIG. 3.

Figures 6A, 6B, 6C, 6D, 6E:
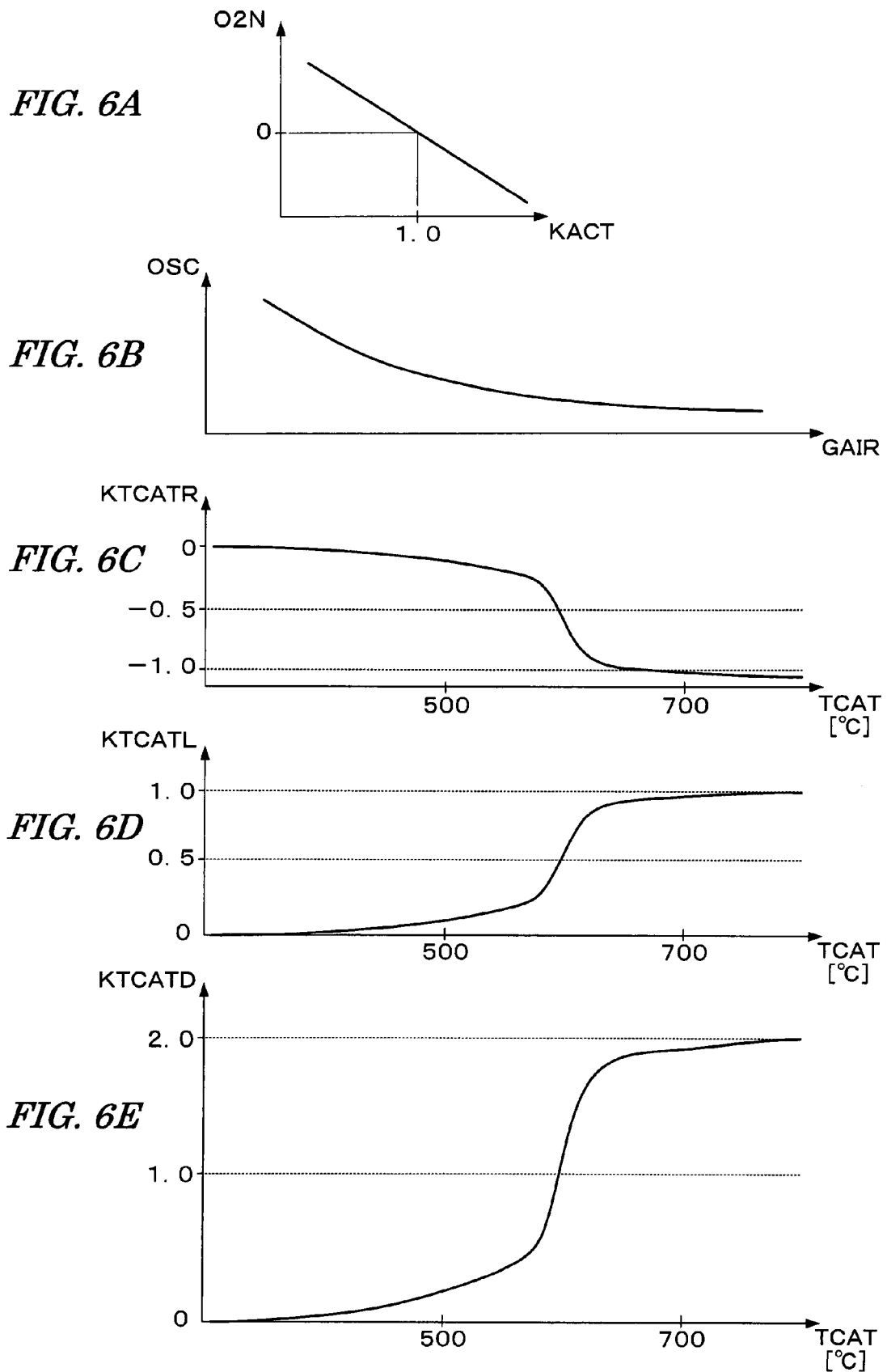
FIGS. 6A-6E are graphs showing tables used in the process of FIG. 4 or FIG. 5.

In step S11, an O2N table graphically shown in FIG. 6A is retrieved according to a detected equivalent ratio KACT calculated according to the output of the LAF sensor 17 to calculate an oxygen concentration parameter O2N which is proportional to an oxygen concentration in exhaust gases. The O2N table is set as follows: the oxygen concentration parameter O2N is set to "0" when the oxygen concentration detected by the LAF sensor 17 is equal to an oxygen concentration O2ST (KACT=1.0) corresponding to the stoichiometric ratio; the oxygen concentration parameter O2N is set to a positive value when the oxygen concentration detected by the LAF sensor 17 is higher than the oxygen concentration O2ST (when the air-fuel ratio is lean with respect to the stoichiometric ratio); and the oxygen concentration parameter O2N is set to a negative value when the oxygen concentration detected by the LAF sensor 17 is lower than the oxygen concentration O2ST (when the air-fuel ratio is rich with respect to the stoichiometric ratio).

In step S12, an OSC table graphically shown in FIG. 6B is retrieved according to the intake air flow rate GAIR to calculate a reference oxygen amount OSC[g] which is a reference of a deteriorated catalyst. The OSC table is set so that the reference oxygen amount OSC decreases as the intake air flow rate GAIR increases. The time period which is necessary for the exhaust gases to pass through the three-way catalyst becomes shorter as the intake air flow rate GAIR increases. A reaction rate (accumulation rate of oxygen) in the three-way catalyst is substantially constant if a catalyst temperature and a difference (b−a) between the oxygen concentration (a) in the exhaust gases flowing into the three-way catalyst and the oxygen concentration (b) in the exhaust gases that exist in the three-way catalyst are constant. Therefore, the amount of oxygen which can be stored in the three-way catalyst decreases as the intake air flow rate GAIR increases. Consequently, the OSC table is set as shown in FIG. 6B.

In step S13, a KTCATR table graphically shown in FIG. 6C is retrieved according to the catalyst temperature TCAT to calculate a first temperature correction coefficient KTCATR. The KTCATR table is set so that the first temperature correction coefficient KTCATR takes a negative value and decreases (the absolute value may increase) as the catalyst temperature TCAT rises.

In step S14, a KTCATL table graphically shown in FIG. 6D is retrieved according to the catalyst temperature TCAT to calculate a second temperature correction coefficient KTCATL. The KTCATL table is set so that the second temperature correction coefficient KTCATL takes a positive value and increases as the catalyst temperature TCAT rises.

In step S15, the reference oxygen amount OSC, and the temperature correction coefficients KTCATR and KTCATL are applied to the following equations (2) and (3) to calculate a rich limit value OSOBJR and a lean limit value OSOBJL.

$$OSOBJR = OSC \times KTCATR \quad (2)$$

$$OSOBJL = OSC \times KTCATL \quad (3)$$

The rich limit value OSOBJR and the lean limit value OSOBJL, which are calculated as described above, are target values of an inflowing oxygen amount OS calculated in step S16 and are used as a threshold value for determining the timing of switching the air-fuel ratio in step S31 or S32 described below. The lean limit value OSOBJL corresponds to an amount of the inflowing oxygen that the normal three-way catalyst can store but the deteriorated three-way catalyst cannot store. The rich limit value OSOBJR is set to a negative value whose absolute value is substantially equal to the lean limit value OSOBJL. In other words, the rich limit value OSOBJR and the lean limit value OSOBJL are set so that the O2 sensor output SVO2 minimally changes when the three-way catalyst is normal, and the O2 sensor output SVO2 greatly changes when the three-way catalyst is deteriorated.

In step S16, the oxygen concentration parameter O2N from step S11 is applied to the following equation (4) to calculate an inflowing oxygen flow rate O2. The inflowing oxygen flow rate O2 is applied to the following equation (5) to calculate an inflowing oxygen amount OS. A preceding value KOSFBZ of the air-fuel ratio switching parameter is set to the present value KOSFB.

$$O2 = O2N \times GAIRAVE \quad (4)$$

$$OS = OS + O2 \quad (5)$$

In equation (4), GAIRAVE is a moving average value of, for example, about six data of the intake air flow rate GAIR. OS on the right side of the equation (5) is a preceding calculated value. The calculation process (not shown) of the moving average value GAIRAVE is executed in synchronism with generation of the CRK pulse.

In step S17, whether the air-fuel ratio switching parameter KOSFB is equal to "−1" is determined. If the answer to step S17 is affirmative (YES), which indicates that the engine 1 is in a lean operating condition, whether a reset flag FRESETOS is equal to "1" (step S25) is determined. The reset flag FRESETOS is set to "1" when the value of the air-fuel ratio switching parameter KOSFB is changed (refer to steps S38 and S40). Since the answer to step S25 is affirmative (YES) immediately after the air-fuel ratio switching parameter KOSFB is changed to "−1", the process proceeds to step S28, wherein whether the inflowing oxygen flow rate O2 is a positive value is determined. The answer to step S28 is negative (NO) at the beginning of lean operation, and the process proceeds step S30, wherein an accumulated value SUMO2 of the oxygen concentration parameter O2N is calculated. The accumulated value SUMO2 is hereinafter referred to as "concentration accumulated value SUMO2". Thereafter, the process proceeds to step S32 (FIG. 5). When lean operation is performed and the oxygen concentration in exhaust gases becomes high, the answer to step S28 becomes affirmative (YES), and the process proceeds to step S29, in which a KOSOBJR calculation process shown in FIG. 8 is performed.

Figure 8:
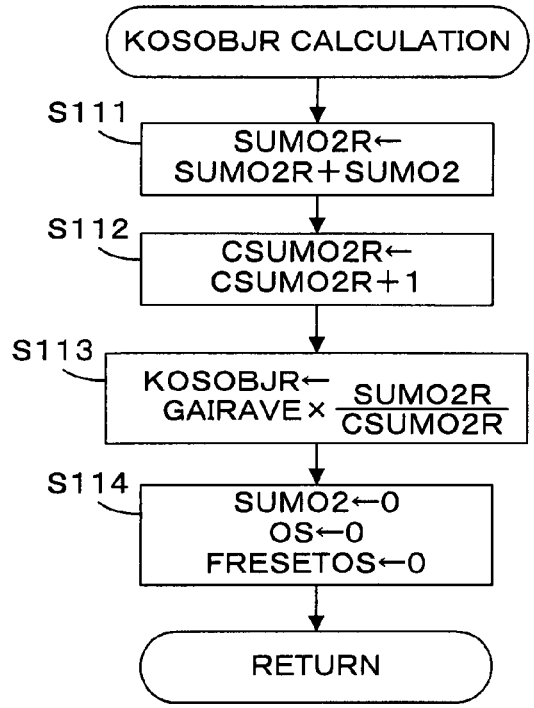
FIG. 8 is a flowchart of the KOSOBJR calculation process executed in the process of FIG. 4.

In step S111 of FIG. 8, an accumulated value SUMO2R of the concentration accumulated value SUMO2 is calculated. The accumulated value SUMO2R is hereinafter referred to as "rich accumulated value SUMO2R". In step S112, a counter CSUMO2R is incremented by "1". In step S113, the moving average value GAIRAVE, the rich accumulated value SUMO2R, and the value of the counter CSUMO2R are applied to the following equation (6), to calculate a rich correction value KOSOBJR.

$$KOSOBJR = GAIRAVE \times SUMO2R/CSUMO2R \quad (6)$$

The rich correction value KOSOBJR is a parameter corresponding to an amount of oxygen (excessive inflowing oxygen amount) flowing into the three-way catalyst 14a during a time period from the time when the air-fuel ratio switching parameter KOSFB is switched from "1" to "−1" (refer to FIGS. 11A-11C, time t4, t8) to the time when the detected equivalent ratio KACT reaches "1.0" (refer to FIGS. 11A-11C, time t5, t9). The rich accumulated value SUMO2R takes a negative value, and consequently, the rich correction value KOSOBJR also takes a negative value. Therefore, the rich correction value KOSOBJR actually indicates an amount of oxygen flowing out from three-way catalyst 14a.

The rich correction value KOSOBJR is applied to a correction of the rich limit value OSOBJR in step S31 described below.

In step S114 of FIG. 8, the concentration accumulated value SUMO2 and the inflowing oxygen amount OS are set to "0" and the reset flag FRESETOS is returned to "0".

Referring back to FIG. 4, after execution of step S29, the process proceeds to step S32 (FIG. 5).

If the reset flag FRESETOS is returned to "0", the answer to step S25 becomes negative (NO) and the process proceeds to step S26, wherein whether the inflowing oxygen amount OS is a negative value is determined. Since the answer to step S26 is normally negative (NO), the process immediately proceeds to step S32. If the inflowing oxygen amount OS is a negative value, the inflowing oxygen amount OS is reset to "0" (step S27) and the process proceeds to step S32.

In step S32, it is determined whether the inflowing oxygen amount OS is greater than a corrected lean limit value (OSOBJL−KOSOBJL) obtained by subtracting a lean correction value KOSOBJL from the lean limit value OSOBJL. The lean correction value KOSOBJL is a correction value of the lean limit value OSOBJL calculated in step S23 described below in the same manner as the rich correction value KOSOBJR. Both the lean correction value KOSOBJL and the rich correction value KOSOBJR are initially set to "0".

Since the answer to step S32 is negative (NO) at the beginning of lean operation, the process proceeds to step S33, wherein whether the O2 sensor output SVO2 is less than a lean predetermined value SVO2LEAN and a downstream oxygen concentration parameter KOSLEAN is equal to "1" (step S33) are determined. The lean predetermined value SVO2LEAN corresponds to an air-fuel ratio which is slightly leaner than the stoichiometric ratio. The downstream oxygen concentration parameter KOSLEAN is set to "0" when the O2 sensor output SVO2 takes a value indicative of a lean air-fuel ratio (refer to step S39). Since the answer to step S33 is normally negative (NO), the process proceeds to step S35, wherein whether the O2 sensor output SVO2 is greater than a rich predetermined value SVO2RICH (>SVO2LEAN) and the downstream oxygen concentration parameter KOSLEAN is equal to "0" are determined. The rich predetermined value SVO2RICH corresponds to an air-fuel ratio which is slightly richer than the stoichiometric ratio. Since the answer to step S35 is also normally negative (NO), the process immediately proceeds to step S41.

Thereafter, the inflowing oxygen amount OS gradually increases as lean operation is continued. If the inflowing oxygen amount OS exceeds the corrected lean limit value (OSOBJL−KOSOBJL) in step S32, the process proceeds to step S40, wherein the air-fuel ratio switching parameter KOSFB is set to "1" and the reset flag FRESETOS is set to "1", thereby starting rich operation.

If the air-fuel ratio switching parameter KOSFB is changed from "−1" to "1", the process proceeds from step S17 to step S19 (FIG. 4), wherein whether the reset flag FRESETOS is equal to "1" is determined. Since the answer to step S19 is initially affirmative (YES), the process proceeds to step S22, wherein whether the inflowing oxygen flow rate O2 is a negative value is determined. At the beginning of rich operation, the answer to step S22 is negative (NO), and the process proceeds to step S24, wherein the concentration accumulated value SUMO2 is calculated. Thereafter, the process proceeds to step S31 (FIG. 5).

When the oxygen concentration in exhaust gases decreases after rich operation is started, the answer to step S22 becomes affirmative (YES), and the process proceeds to step S23, wherein a KOSOBJL calculation process shown in FIG. 7 is performed.

In step S101 of FIG. 7, an accumulated value SUMO2L of the concentration accumulated value SUMO2 is calculated. The accumulated value SUMO2L is hereinafter referred to as "lean accumulated value SUMO2L". In step S102, a counter CSUMO2L is incremented by "1". In step S103, the moving average value GAIRAVE, the lean accumulated value SUMO2L, and the value of the counter CSUMO2L are applied to the following equation (6), to calculate a lean correction value KOSOBJL.

$$KOSOBJL = GAIRAVE \times SUMO2L/CSUMO2L \quad (7)$$

The lean correction value KOSOBJL is a parameter corresponding to an amount of oxygen (excessive inflowing oxygen amount) flowing into the three-way catalyst 14a during a time period from the time when the air-fuel ratio switching parameter KOSFB is switched from "−1" to "1" (refer to FIGS. 11A-11C, time t2, t6) to the time when the detected equivalent ratio KACT reaches "1.0" (refer to FIGS. 11A-11C, time t3, t7).

In step S104 of FIG. 7, the concentration accumulated value SUMO2 and the inflowing oxygen amount OS are set at "0" and the reset flag FRESETOS is returned to "0".

Referring back to FIG. 4, after execution of step S23, the process proceeds to step S31 (FIG. 5). The inflowing oxygen amount OS thereafter takes a negative value during rich operation. This means that reducing components (HC, CO) are supplied to the three-way catalyst 14a, and the accumulated oxygen is used for oxidizing the reducing components and, thus, decreases (flows out from the three-way catalyst 14a).

If the reset flag FRESETOS is returned to "0", the answer to step S19 becomes negative (NO), and the process proceeds to step S20, wherein whether the inflowing oxygen amount OS is a positive value is determined. Since the answer to step S20 is normally negative (NO), the process immediately proceeds to step S31. If the inflowing oxygen amount OS is a positive value, the inflowing oxygen amount OS is reset to "0" (step S21), and the process proceeds to step S31.

In step S31 (FIG. 5), whether the inflowing oxygen amount OS is less than a corrected rich limit value (OSOBJR−KOSOBJR) obtained by subtracting the rich correction value KOSOBJR from the rich limit value OSOBJR is determined. Since the answer to step S31 is negative (NO) at the beginning of rich operation, the process proceeds to step S33 described above. Normally, both of the answers to steps S33 and S35 are negative (NO).

Thereafter, the inflowing oxygen amount OS gradually decreases (the absolute value of the inflowing oxygen amount OS increases) as rich operation is continued. If the inflowing oxygen amount OS becomes less than the corrected rich limit value (OSOBJR−KOSOBJR) in step S31, the process proceeds to step S38, wherein the air-fuel ratio switching parameter KOSFB is set to "−1" and the reset flag FRESETOS is set to "1", thereby starting lean operation.

If the degree of deterioration of the three-way catalyst 14a increases, the answer to step S33 may become affirmative (YES) during lean operation. Then, the process proceeds from step S33 to step S39, wherein the downstream oxygen concentration parameter KOSLEAN is set to "0". Thereafter, the process proceeds to step S40 to start rich operation. That is, in this case, before the inflowing oxygen amount OS exceeds the lean limit value OSOBJL, the switching to rich operation is performed. Further, the answer to step S35 may become affirmative (YES) during rich operation. Then, the process proceeds from step S35 to step S37, wherein the downstream oxygen concentration parameter KOSLEAN is set to "1". Thereafter, the process proceeds to step S38, to start lean operation. That is, in this case, before the inflowing oxygen amount OS becomes lower than the rich limit value OSOBJR, the switching to lean operation is performed.

The determination using the downstream oxygen concentration parameter KOSLEAN in addition to the O2 sensor output SVO2 is performed for preventing the control from hunting with hysteresis.

According to steps S33, S35, S37, and S39, the exhaust characteristics are prevented from deteriorating even when the three-way catalyst 14a is deteriorated and the O2 sensor output SVO2 changes before the inflowing oxygen amount OS exceeds the limit values OSOBJL and OSOBJR.

In step S41, a KTCATD table graphically shown in FIG. 6E is retrieved according to the catalyst temperature TCAT to calculate a third temperature correction coefficient KTCATD. The KTCATD table is set so that the third temperature correction coefficient KTCATD increases as the catalyst temperature TCAT rises, like the KTCATL table. Further, at the same catalyst temperature TCAT, the third temperature correction coefficient KTCATD is set to a value greater than the second temperature correction coefficient KTCATL.

In step S42, the third temperature correction coefficient and the reference oxygen amount OSC calculated in step S12 are applied to the following equation (8) to calculate an inhibition determination threshold value OSDISABLE.

$$OSDISABLE = OSC \times KTCATD \quad (8)$$

In step S43, whether the absolute value of the inflowing oxygen amount OS is greater than the inhibition determination threshold value OSDISABLE is determined. When the answer to step S43 is affirmative (YES), an inhibition flag FDISABLEOS is set to "1" (step S45). When |OS| is equal to or less than OSDISABLE, the inhibition flag FDISABLEOS is set to "0" (step S44). If the inhibition flag FDISABLEOS is set to "1", the deterioration determination of the catalyst is stopped (refer to FIG. 12, step S71).

For example, when the throttle valve opening rapidly changes and the air-fuel ratio control cannot quickly follow the change in the intake air amount, the absolute value of the inflowing oxygen amount OS may become unusually large. In such a case, the deterioration determination cannot be accurately performed. Therefore, determination accuracy is prevented from decreasing by inhibiting the deterioration determination.

Figure 9:
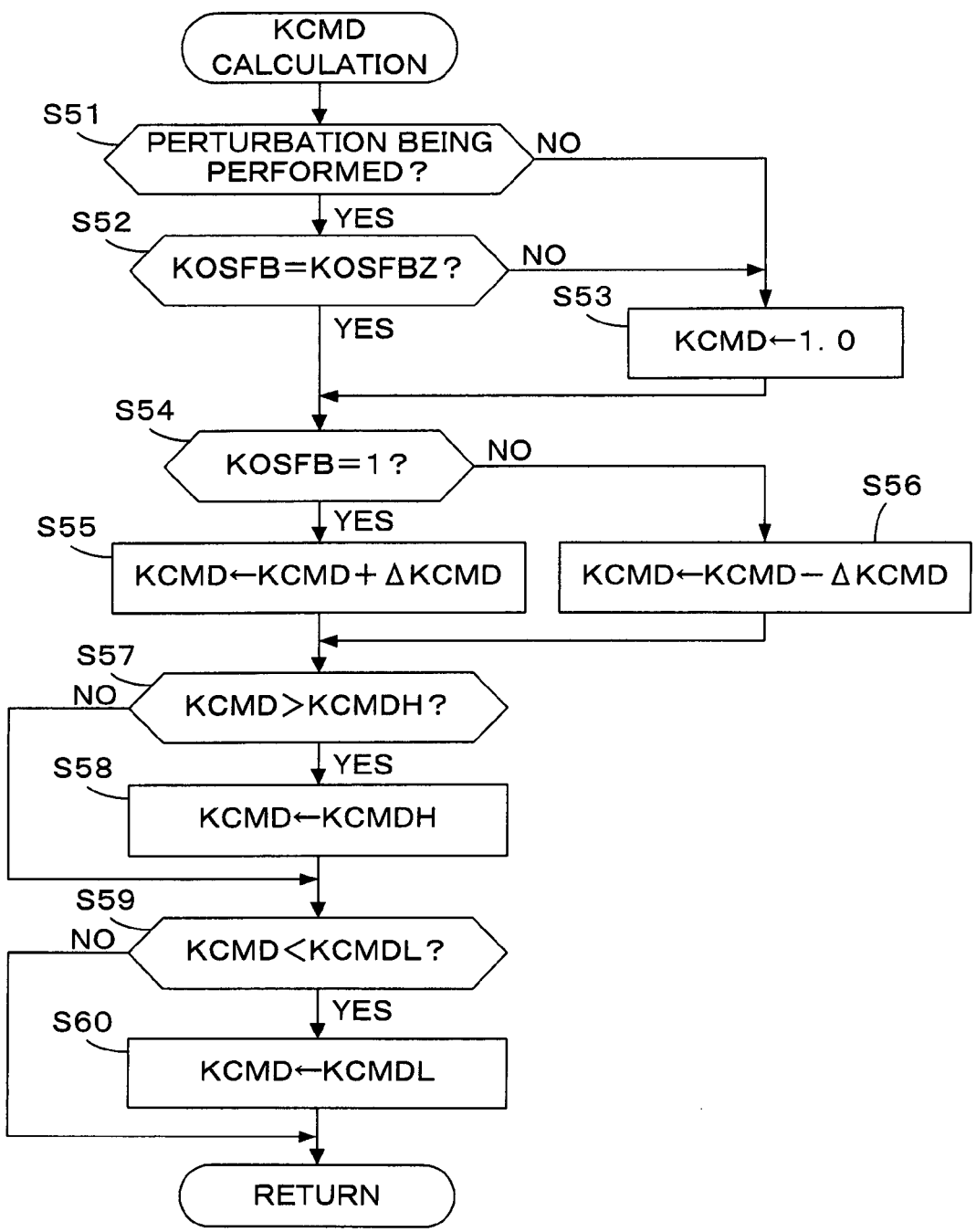
FIG. 9 is a flowchart of the KCMD calculation process executed in the process of FIG. 3.

FIG. 9 is a flowchart of the KCMD calculation process executed in step S2 of FIG. 3.

In step S51, whether the perturbation of the air-fuel ratio has been executed is determined. If the answer to step S51 is affirmative (YES), whether the air-fuel ratio switching parameter KOSFB set in the process of FIGS. 4 and 5 is equal to the preceding value KOSFBZ is determined in step S52.

If the answer to either step S51 or S52 is negative (NO) and the perturbation is not executed, or if the value of the air-fuel ratio switching parameter KOSFB has changed, the target air-fuel ratio coefficient KCMD is set to "1.0" (step S53), and the process proceeds to step S54. If KOSFB is equal to KOSFBZ, the process immediately proceeds to step S54.

In step S54, whether the air-fuel ratio switching parameter KOSFB is equal to "1" is determined. If the answer to step S54 is affirmative (YES), the target air-fuel ratio coefficient KCMD is updated by equation (9) (step S55).

$$KCMD = KCMD + \Delta KCMD \quad (9)$$

where $\Delta KCMD$ is a predetermined updating value, for example, set to "0.0002".

If the air-fuel ratio switching parameter KOSFB is equal to "1", the target air-fuel ratio coefficient KCMD gradually increases from "1.0" by repeatedly executing step S55. That is, the air-fuel ratio gradually changes in the rich direction.

If KOSFB is equal to "−1" in step S54, the target air-fuel ratio coefficient KCMD is updated by equation (10) (step S56).

$$KCMD = KCMD - \Delta KCMD \quad (10)$$

Therefore, if the air-fuel ratio switching parameter KOSFB is equal to "−1", the target air-fuel ratio coefficient KCMD gradually decreases from "1.0" by repeatedly executing step S56. That is, the air-fuel ratio gradually changes in the lean direction.

In steps S57 to S60, a limit process of the calculated target air-fuel ratio coefficient KCMD is performed. That is, if the target air-fuel ratio coefficient KCMD is greater than an upper limit value KCMDH (for example, "1.03"), the target air-fuel ratio coefficient KCMD is set to the upper limit value KCMDH (steps S57, S58). If the target air-fuel ratio coefficient KCMD is less than a lower limit value KCMDL (for example, "0.97"), the target air-fuel ratio coefficient KCMD is set to the lower limit value KCMDL (steps S59, S60).

According to the process of FIG. 9, the target air-fuel ratio coefficient KCMD changes, as graphically shown in FIG. 10B, according to the value of the air-fuel ratio switching parameter KOSFB (graphically shown in FIG. 10A).

FIGS. 11A-11C graphically show time charts for illustrating changes in the target equivalent ratio KCMD, the detected equivalent ratio KACT, and the inflowing oxygen amount OS. In the example shown in FIGS. 11A-11C, the lean correction value KOSOBJL is equal to "0" before time t3, and the rich correction value KOSOBJR is equal to "0" before time t5.

When the inflowing oxygen amount OS exceeds the lean limit value OSOBJL at time t2, the air-fuel ratio switching parameter KOSFB is changed from "−1" to "1", and the concentration accumulated value SUMO2 gradually increases (FIG. 4, step S24). When the detected equivalent ratio KACT reaches "1.0" at time t3, the lean correction value KOSOBJL is calculated and the inflowing oxygen amount OS is reset to "0" (FIG. 4, step S23).

Thereafter, when the inflowing oxygen amount OS gradually decreases to become lower than the rich limit value OSOBJR at time t4, the air-fuel ratio switching parameter KOSFB is changed from "1" to "−1". When the concentration accumulated value SUMO2 gradually decreases (FIG. 4, step S30) and the detected equivalent ratio KACT reaches "1.0" at time t5, the rich correction value KOSOBJR is calculated and the inflowing oxygen amount OS is reset to "0" (FIG. 4, step S29).

Thereafter, the inflowing oxygen amount OS gradually increases to exceed the corrected lean limit value (OSOBJL−KOSOBJL) at time t6. At time t7, the detected equivalent ratio KACT reaches "1.0" and the inflowing oxygen amount OS is reset. Thereafter, the inflowing oxygen amount OS gradually decreases to become lower than the corrected rich limit value (OSOBJR−KOSOBJR) at time t8. The detected equivalent ratio KACT reaches "1.0" at time t9, and the inflowing oxygen amount OS is reset.

By using the corrected lean limit value (OSOBJL−KOSOBJL) and the corrected rich limit value (OSOBJR−KOSOBJR), the perturbation control of the air-fuel ratio is performed so that the inflowing oxygen amount OS changes within the range defined by the lean limit value OSOBJL and the rich limit value OSOBJR. Consequently, an actual amount of oxygen flowing into the three-way catalyst 14a can be controlled more appropriately, and accuracy of determining the catalyst deterioration can be improved.

FIGS. 12 and 13 show a flowchart of the deterioration determination process executed in step S3 of FIG. 3.

In step S71, whether the inhibition flag FDISABLEOS is equal to "1" is determined. If the answer to step S71 is negative (NO), whether the perturbation of the air-fuel ratio is being executed (step S72) is determined. If the answer to step S71 is affirmative (YES) or the answer to step S72 is negative (NO), a maximum value SVO2MAX of the O2 sensor output SVO2 is set to "0" and a minimum value SVO2MIN is set to "1500" (step S73), and the process immediately ends.

If the answer to step S72 is affirmative (YES), i.e., if the perturbation of the air-fuel ratio is being executed, whether the air-fuel ratio switching parameter KOSFB is equal to the preceding value KOSFBZ (step S74) is determined. If KOSFB is equal to KOSFBZ, the maximum value SVO2MAX and the minimum value SVO2MIN are updated by the following equations (11) and (12). The right side of equation (11) is an operation for selecting a greater one of the preceding maximum value SVO2MAX and the present O2 sensor output SVO2. The right side of equation (12) is an operation for selecting a smaller one of the preceding minimum value SVO2MIN and the present O2 sensor output SVO2. After executing step S75, the process proceeds to step S89.

$$SVO2MAX = \max(SVO2MAX, SVO2) \quad (9)$$

$$SVO2MIN = \min(SVO2MIN, SVO2) \quad (10)$$

If the answer to step S74 is negative (NO), i.e., immediately after the air-fuel ratio switching parameter KOSFB has changed, a second stored value SVO2LP2 of the maximum value SVO2MAX or the minimum value SVO2MIN is set to a first stored value SVO2LP1 (step S76). The first stored value SVO2LP1 is set to the maximum value SVO2MAX or the minimum value SVO2MIN in step S78 or S80 immediately after the latest air-fuel ratio switching.

In step S77, whether the air-fuel ratio switching parameter KOSFB is equal to "1" is determined. If the answer to step S77 is affirmative (YES), the first stored value SVO2LP1 is set to the present maximum value SVO2MAX, and the maximum value SVO2MAX is reset to "0" (step S78). If the air-fuel ratio switching parameter KOSFB is equal to "−1", the answer to step S77 is negative (NO). Then, the process immediately proceeds to step S79.

In step S79, whether the air-fuel ratio switching parameter KOSFB is equal to "−1" is determined. If the air-fuel ratio switching parameter KOSFB is equal to "−1", the process proceeds to step S80, wherein the first stored value SVO2LP1 is set to the present minimum value SVO2MIN, and the minimum value SVO2MIN is reset to "1500" (step S78). If the air-fuel ratio switching parameter KOSFB is equal to "1", the answer to step S79 is negative (NO). Then, the process immediately proceeds to step S81.

In step S81, a third difference parameter SVO2D3 indicative of a difference between the maximum value SVO2MAX and the minimum value SVO2MIN is set to a second difference parameter SVO2D2, and the second difference parameter SVO2D2 is set to a first difference parameter SVO2D1. Thereafter, the first difference parameter SVO2D1 is updated in steps S82 to S87.

In step S82, whether the second stored value SVO2LP2 is greater than a predetermined value SVO2OBJ corresponding to the stoichiometric ratio and the first stored value SVO2LP1 is less than the predetermined value SVO2OBJ are determined. If the answer to step S82 is negative (NO), whether the second stored value SVO2LP2 is less than the predetermined value SVO2OBJ and the first stored value SVO2LP1 is greater than the predetermined value SVO2OBJ (step S84) is further determined. When both the answers to steps S82 and S84 are negative (NO), i.e., both of the first and the second stored value SVO2LP1 and SVO2LP2 are less than the predetermined value SVO2OBJ, or when both the first and the second stored values SVO2LP1 and SVO2LP2 are greater than the predetermined value SVO2OBJ, there is the situation that the O2 sensor output SVO2 minimally changes (stays at a substantially constant level). Accordingly, the first difference parameter SVO2D1 is set to "0" (step S87) and the process proceeds to step S88.

If the answer to steps S82 or S84 is affirmative (YES), i.e., the maximum value SVO2MAX is greater than the predetermined value SVO2OBJ and the minimum value SVO2MIN is less than the predetermined value SVO2OBJ at consecutive timings of the air-fuel ratio switching, the first stored value SVO2LP1 and the second stored value SVO2LP2 are applied to equation (13) to calculate the first difference parameter SVO2D1 (step S86). Thereafter, the process proceeds to step S88.

$$SVO2D1 = |SVO2LP1 - SVO2LP2| \quad (13)$$

In step S88, a minimum difference value SVO2D, which is the minimum value of the first-to-third difference parameters SVO2D1, SVO2D2, and SVO2D3, is calculated by the following equation (14). Further, the minimum difference value SVO2D is accumulated to calculate a determination parameter RESULT by the following equation (15), and a counter CRESULT is incremented by "1". The determination parameter RESULT indicates the deterioration degree of the three-way catalyst 14a.

$$SVO2D = \min(SVO2D1, SVO2D2, SVO2D3) \quad (14)$$

$$RESULT = RESULT + SVO2D \quad (15)$$

Unless the difference parameter SVO2D1 takes a large value at three consecutive timings or more, the minimum difference value SVO2D takes a relatively small value. Therefore, by using the minimum difference value SVO2D, which is the minimum value among the difference parameters SVO2D1, SVO2D2, and SVO2D3 obtained at three consecutive sampling timings, any influence of a temporary change in the O2 sensor output SVO2 can be eliminated. Accordingly, an accurate determination parameter RESULT can be obtained.

In step S89, whether the value of the counter CRESULT is greater than a predetermined number CRST0 (for example, "6") is determined. If the answer to step S89 is negative (NO), the process immediately ends. If the value of the counter CRESULT exceeds the predetermined number CRST0 in step S89, the process proceeds to step S90, wherein whether the determination parameter RESULT is greater than the deterioration determination threshold value RSTTH is determined. If the answer to step S90 is negative (NO), the three-way catalyst 14a is determined to be normal (step S92). If the determination parameter RESULT exceeds the deterioration determination threshold value RSTTH, the three-way catalyst 14a is determined to be abnormal (i.e., deteriorated beyond an acceptable amount) (step S91), and the warning lamp can be turned on.

The determination parameter RESULT takes a value substantially equal to zero when the O2 sensor output SVO2 changes as shown in FIG. 2A, i.e., when the three-way catalyst 14a is normal. On the other hand, the determination parameter RESULT takes a large value when the O2 sensor output SVO2 changes as shown in FIG. 2B, i.e., when the three-way catalyst 14a is deteriorated. Accordingly, the deterioration degree of the three-way catalyst 14a can be accurately detected by using the determination parameter RESULT.

As described above, in this embodiment, the amount OS of oxygen flowing into the three-way catalyst 14a is calculated according to the oxygen concentration parameter O2N calculated according to the LAF sensor 17 output and the intake air flow rate GAIR detected by the intake air flow rate sensor 7, and the perturbation control of the air-fuel ratio is performed. During the perturbation control, the air-fuel ratio is controlled to alternately change between lean and rich with respect to the stoichiometric ratio according to a comparison result obtained by comparing the inflowing oxygen amount OS with the corrected rich limit value (OSOBJR−KOSOBJR) or the corrected lean limit value (OSOBJL−KOSOBJL). Further, the determination parameter RESULT indicative of the deterioration degree of the three-way catalyst 14a is calculated based on the O2 sensor output SVO2 during execution of perturbation control. The corrected rich limit value (OSOBJR−KOSOBJR) and the corrected lean limit value (OSOBJL−KOSOBJL), which are target values of the inflowing oxygen amount OS, are set so that the O2 sensor output SVO2 may minimally change when the three-way catalyst is normal and the O2 sensor output SVO2 may greatly change when the three-way catalyst is deteriorated. Therefore, the deterioration degree can be detected quickly at the time the catalyst begins to deteriorate, resulting in minimal degradation of the exhaust characteristics and without degrading the exhaust characteristics at all when the catalyst remains normal.

In this embodiment, the correction values KOSOBJL and KOSOBJR are calculated as the excessive inflowing oxygen amount indicating an amount of oxygen flowing into the three-way catalyst 14a during the time period from the time when the air-fuel ratio switching parameter KOSFB is switched from "−1" to "1" or vice versa to the time when the detected equivalent ratio KACT reaches "1.0" corresponding to the stoichiometric ratio. Further, the lean limit value OSOBJL and the rich limit value OSOBJR are corrected with the correction values KOSOBJL and KOSOBJR. Due to some causes such as adhesion of fuel to the intake port of the engine 1, or a response delay of the LAF sensor 17, there is a delay time period from the time when the target equivalence ratio KCMD is changed to the time when the detected equivalent ratio KACT changes to a value corresponding to the changed air-fuel ratio. The excessive inflowing oxygen amount is an amount of oxygen flowing into the three-way catalyst during this delay time period. Therefore, by correcting the lean limit value OSOBJL and the rich limit value OSOBJR with the excessive inflowing oxygen amounts, i.e., the correction values KOSOBJL and KOSOBJR, the actual amount of oxygen flowing into the three-way catalyst is appropriately controlled, thereby improving determination accuracy of the catalyst deterioration.

In this embodiment, the intake airflow rate sensor 7, the LAF sensor 17, and the O2 sensor 18 respectively correspond to the intake air flow rate detecting means, the first oxygen concentration sensor, and the second oxygen concentration sensor. Further, the ECU 5 constitutes the inflowing oxygen amount calculating means, the air-fuel ratio switching control means, the excessive inflowing oxygen amount calculating means, the target value correcting means, and the deterioration detecting means. Specifically, steps S11 and S16 of FIG. 4 correspond to the inflowing oxygen amount calculating means; steps S12 to S15 and S17 to S30 of FIG. 4, steps S31 to S40 of FIG. 5, and the process of FIG. 9 correspond to the air-fuel ratio switching control means; steps S23, S24, S29 and S30 of FIG. 4 correspond to the excessive inflowing oxygen amount calculating means; steps S31 and S32 of FIG. 5 correspond to the target value correcting means; and steps S72 to S81 of FIG. 12 and steps S82 to S92 of FIG. 13 correspond to the deterioration detecting means.

The present invention is not limited to the embodiment described above and various modifications may be made. For example, the perturbation signal generation process shown in FIGS. 14 and 15 may be used instead of the perturbation signal generation process shown in FIGS. 4 and 5.

Figure 14:
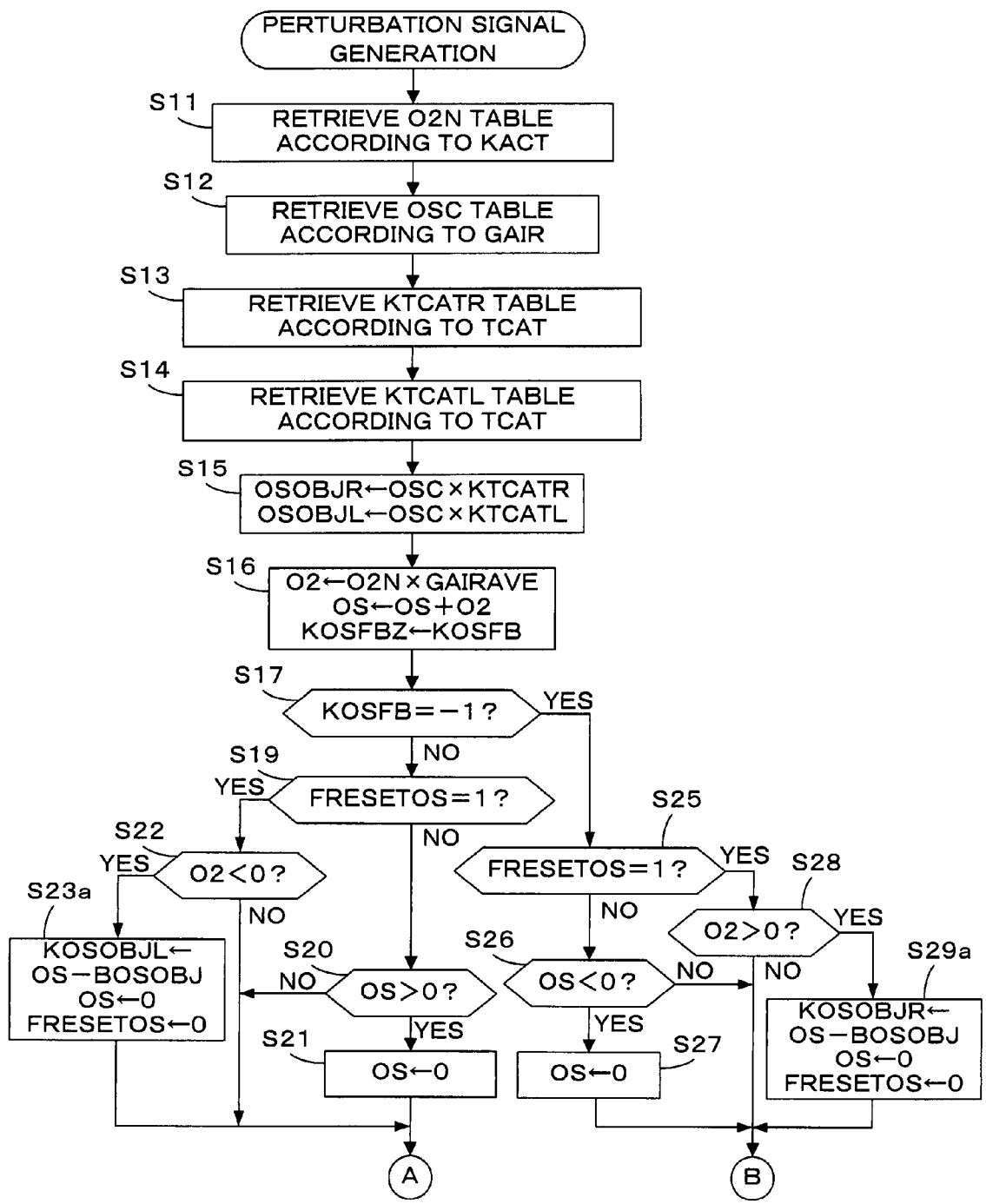
FIGS. 14 and 15 are flowcharts of a modification of the process of FIGS. 4 and 5.
Figure 15:
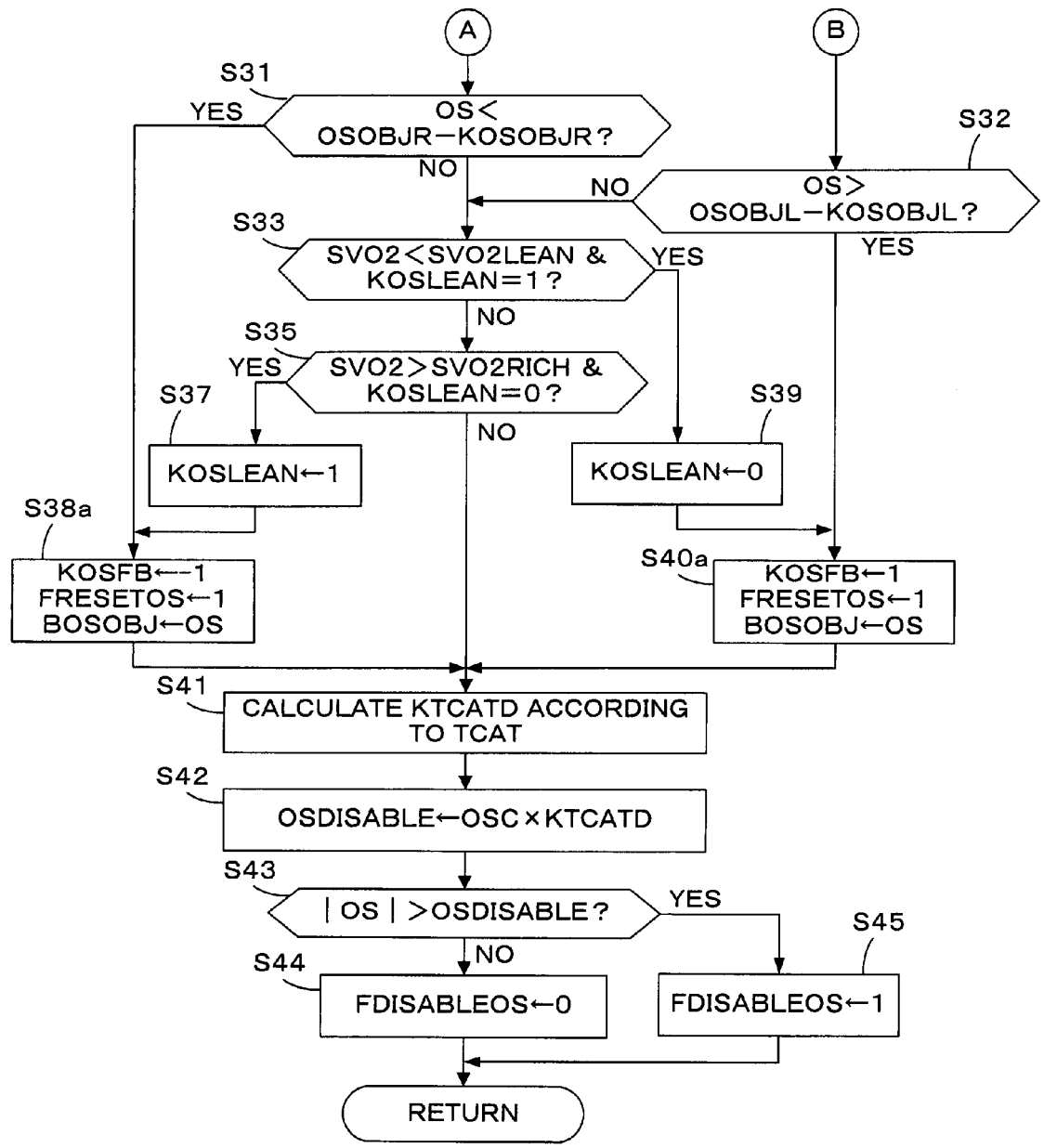

FIG. 14 is obtained by deleting steps S24 and S30 of FIG. 4, and changing steps S23 and S29, respectively, to steps S23a and S29a. Further, FIG. 15 is obtained by changing steps S38 and S40 of FIG. 5, respectively, to steps S38a and S40a. Except for the points described above, the process of FIGS. 14 and 15 is the same as the process of FIGS. 4 and 5.

In step S23a, the lean correction value KOSOBJL is calculated by equation (16), and both of the inflowing oxygen amount OS and the reset flag FRESETOS are reset to "0".

$$KOSOBJL = OS - BOSOBJ \quad (16)$$

BOSOBJ in equation (16) is a stored value which is stored in the latest execution of step S40a and indicates the inflowing oxygen amount OS at the time when the air-fuel ratio switching parameter KOSFB is changed from "−1" to "1". The stored value BOSOBJ corresponds to the inflowing oxygen amount OS at time t2 of FIG. 11C. Further, OS in equation (16) corresponds to the value at time t3 of FIG. 11C. Therefore, the excessive inflowing oxygen amount during lean operation can be calculated by equation (16).

In step S29a, the rich correction value KOSOBJR is calculated by the following equation (17), and both the inflowing oxygen amount OS and the reset flag FRESETOS are reset to "0".

$$KOSOBJR = OS - BOSOBJ \quad (17)$$

BOSOBJ in equation (17) is a stored value which is stored in the latest execution of step S38a and indicates the inflowing oxygen amount OS at the time when the air-fuel ratio switching parameter KOSFB is changed from "1" to "−1". The stored value BOSOBJ corresponds to the inflowing oxygen amount OS at time t4 of FIG. 11C. OS in the equation (17) corresponds to the value at time t5 of FIG. 11C. Therefore, the excessive inflowing oxygen amount during the rich operation (which takes a negative value and actually indicates an outflowing oxygen amount) can be calculated by equation (17).

In step S38a of FIG. 15, the air-fuel ratio switching parameter KOSFB is set to "−1", the reset flag FRESETOS is set to "1", and the present inflowing oxygen amount OS is stored as the stored value BOSOBJ. Further, in step S40a, the air-fuel ratio switching parameter KOSFB is set to "1", the reset flag FRESETOS is set to "1", and the present inflowing oxygen amount OS is stored as the stored value BOSOBJ.

According to this modification, the lean correction value KOSOBJL and the rich correction value KOSOBJR, which correspond to the excessive inflowing oxygen amounts, can be calculated, and the lean limit value OSOBJL and the rich limit value OSOBJR can be appropriately corrected.

In this modification, steps S38a and S40a of FIG. 15 correspond to the storing means.

In the embodiment described above, the three-way catalysts 14a and 14b are contained in one container. Alternatively, the two catalysts may be contained in two separate containers. Further, even if the three-way catalyst is not provided downstream of the O2 sensor 18, the present invention is applicable. Even in such a case, compared with the conventional technique, the present invention can reduce deterioration of the exhaust characteristics when performing the deterioration determination of the catalyst.

The present invention can be applied also to the deterioration determination of a catalyst for purifying exhaust gases provided in an exhaust system of a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A deterioration detecting apparatus for a catalyst provided in an exhaust system of an internal combustion engine for purifying exhaust gases, said deterioration detecting apparatus detecting deterioration of said catalyst and comprising:

intake air flow rate detecting means for detecting an intake air flow rate of said engine;

a first oxygen concentration sensor disposed upstream of said catalyst;

a second oxygen concentration sensor disposed downstream of said catalyst;

inflowing oxygen amount calculating means for calculating an amount of oxygen flowing into said catalyst according to an oxygen concentration detected by said first oxygen concentration sensor and the intake air flow rate detected by said intake air flow rate detecting means;

air-fuel ratio switching control means for alternately switching a control command value of an air-fuel ratio of an air-fuel mixture supplied to said engine between a first value corresponding to a lean air-fuel ratio which is leaner than the stoichiometric ratio and a second value corresponding to a rich air-fuel ratio which is richer than the stoichiometric ratio, according to a result of comparison between the inflowing oxygen amount calculated by said inflowing oxygen amount calculating means and target values of the inflowing oxygen amount;

excessive inflowing oxygen amount calculating means for calculating excessive inflowing oxygen amounts which are amounts of oxygen flowing into said catalyst from the time when the control command value is switched from the first value to the second value or vice versa to the time when the oxygen concentration detected by said first oxygen concentration sensor reaches a value corresponding to the stoichiometric ratio;

target value correcting means for correcting the target values of the inflowing oxygen amount with the excessive inflowing oxygen amount; and deterioration detecting means for detecting a deterioration degree of said catalyst based on an output of said second oxygen concentration sensor during an operation of said air-fuel ratio switching control means, wherein said air-fuel ratio switching control means performs the switching of the air-fuel ratio using the target values corrected by said target value correcting means.

2. A deterioration detecting apparatus according to claim 1, wherein said excessive inflowing oxygen amount calculating means accumulates the oxygen concentration detected by said first oxygen concentration sensor from the time when the control command value is switched from the first value to the second value or vice versa to the time when the oxygen concentration detected by said first oxygen concentration sensor reaches the value corresponding to the stoichiometric ratio, and multiplies the accumulated oxygen concentration by the inflowing air flow rate to calculate the excessive inflowing oxygen amounts.

3. A deterioration detecting apparatus according to claim 1, wherein said excessive inflowing oxygen amount calculating means includes storing means for storing a value of the inflowing oxygen amount obtained at the time when the control command value is switched from the first value to the second value or vice versa, as a switching time inflowing oxygen amount, and total inflowing oxygen amount calculating means for calculating a total inflowing oxygen amount which is an amount of oxygen flowing into said catalyst from the time when the oxygen concentration detected by said first oxygen concentration sensor reaches the value corresponding to the stoichiometric ratio to the time when the oxygen concentration detected by said first oxygen concentration sensor next reaches the value corresponding to the stoichiometric ratio, wherein said excessive inflowing oxygen amount calculating means calculates the excessive inflowing oxygen amounts with the switching time inflowing oxygen amount and the total inflowing oxygen amount.

4. A deterioration detecting method for a catalyst provided in an exhaust system of an internal combustion engine for purifying exhaust gases, said exhaust system having a first oxygen concentration sensor disposed upstream of said catalyst and a second oxygen concentration sensor disposed downstream of said catalyst, said deterioration detecting method comprising the steps of:
- a) detecting an intake air flow rate of said engine;
- b) calculating an amount of oxygen flowing into said catalyst according to an oxygen concentration detected by said first oxygen concentration sensor and the detected intake air flow rate;
- c) alternately switching a control command value of an air-fuel ratio of an air-fuel mixture supplied to said engine between a first value corresponding to a lean air-fuel ratio which is leaner than the stoichiometric ratio and a second value corresponding to a rich air-fuel ratio which is richer than the stoichiometric ratio, according to a result of comparison between the calculated inflowing oxygen amount and target values of the inflowing oxygen amount;
- d) calculating excessive inflowing oxygen amounts which are amounts of oxygen flowing into said catalyst from the time when the control command value is switched from the first value to the second value or vice versa to the time when the oxygen concentration detected by said first oxygen concentration sensor reaches a value corresponding to the stoichiometric ratio;
- e) correcting the target values of the inflowing oxygen amount with the excessive inflowing oxygen amount; and
- f) detecting a deterioration degree of said catalyst based on an output of said second oxygen concentration sensor when performing the switching of the control command value in said step c), wherein the switching of the control command value in step c) is performed using the target values corrected in said step e).

5. A deterioration detecting method according to claim 4, further comprising accumulating the oxygen concentration detected by said first oxygen concentration sensor from the time when the control command value is switched from the first value to the second value or vice versa to the time when the oxygen concentration detected by said first oxygen concentration sensor reaches the value corresponding to the stoichiometric ratio, and multiplying the accumulated oxygen concentration by the inflowing air flow rate to calculate the excessive inflowing oxygen amounts.

6. A deterioration detecting method according to claim 4, wherein said step d) includes the steps of:
- i) storing a value of the inflowing oxygen amount obtained at the time when the control command value is switched from the first value to the second value or vice versa as a switching time inflowing oxygen amount; and
- ii) calculating a total inflowing oxygen amount which is an amount of oxygen flowing into said catalyst from the time when the oxygen concentration detected by said first oxygen concentration sensor reaches the value corresponding to the stoichiometric ratio to the time when the oxygen concentration detected by said first oxygen concentration sensor next reaches the value corresponding to the stoichiometric ratio, wherein the excessive inflowing oxygen amounts are calculated with the switching time inflowing oxygen amount and the total inflowing oxygen amount.

7. A computer program embodied on a computer-readable medium for causing a computer to implement a deterioration detecting method for a catalyst provided in an exhaust system of an internal combustion engine for purifying exhaust gases, said exhaust system having a first oxygen concentration sensor disposed upstream of said catalyst and a second oxygen concentration sensor disposed downstream of said catalyst, said deterioration detecting method comprising the steps of:
- a) detecting an intake air flow rate of said engine;
- b) calculating an amount of oxygen flowing into said catalyst according to an oxygen concentration detected by said first oxygen concentration sensor and the detected intake air flow rate;
- c) alternately switching a control command value of an air-fuel ratio of an air-fuel mixture supplied to said engine between a first value corresponding to a lean air-fuel ratio which is leaner than the stoichiometric ratio and a second value corresponding to a rich air-fuel ratio which is richer than the stoichiometric ratio according to a result of comparison between the calculated inflowing oxygen amount and target values of the inflowing oxygen amount;
- d) calculating excessive inflowing oxygen amounts which are amounts of oxygen flowing into said catalyst from the time when the control command value is switched from the first value to the second value or vice versa to the time when the oxygen concentration detected by said first oxygen concentration sensor reaches a value corresponding to the stoichiometric ratio;
- e) correcting the target values of the inflowing oxygen amount with the excessive inflowing oxygen amount; and
- f) detecting a deterioration degree of said catalyst based on an output of said second oxygen concentration sensor when performing the switching of the control command value in said step c), wherein the switching of the control command value in step c) is performed using the target values corrected in said step e).

8. A computer program according to claim 7, wherein the method further comprises accumulating the oxygen concentration detected by said first oxygen concentration sensor from the time when the control command value is switched from the first value to the second value or vice versa to the time when the oxygen concentration detected by said first oxygen concentration sensor reaches the value corresponding to the stoichiometric ratio, and multiplying the accumulated oxygen concentration by the inflowing air flow rate to calculate the excessive inflowing oxygen amounts.

9. A computer program according to claim 7, wherein said step d) of the method includes the steps of:
- i) storing a value of the inflowing oxygen amount obtained at the time when the control command value is switched from the first value to the second value or vice versa as a switching time inflowing oxygen amount; and
- ii) calculating a total inflowing oxygen amount which is an amount of oxygen flowing into said catalyst from the time when the oxygen concentration detected by said first oxygen concentration sensor reaches the value corresponding to the stoichiometric ratio to the time when the oxygen concentration detected by said first oxygen concentration sensor next reaches the value corresponding to the stoichiometric ratio, wherein the excessive inflowing oxygen amounts are calculated with the switching time inflowing oxygen amount and the total inflowing oxygen amount.

* * * * *